United States Patent
Wahby

(10) Patent No.: US 9,531,284 B2
(45) Date of Patent: Dec. 27, 2016

(54) PSEUDO-CONSTANT FREQUENCY CONTROL FOR VOLTAGE CONVERTER

(71) Applicant: Silicon Laboratories Inc., Austin, TX (US)

(72) Inventor: Riad S. Wahby, New York, NY (US)

(73) Assignee: Silicon Laboratories Inc., Austin, TX (US)

( * ) Notice: Subject to any disclaimer, the term of this patent is extended or adjusted under 35 U.S.C. 154(b) by 100 days.

(21) Appl. No.: 14/168,847

(22) Filed: Jan. 30, 2014

(65) Prior Publication Data

US 2015/0214825 A1    Jul. 30, 2015

(51) Int. Cl.
| H02M 3/156 | (2006.01) |
| H02M 3/335 | (2006.01) |
| H02M 1/44 | (2007.01) |

(52) U.S. Cl.
CPC ......... *H02M 3/33569* (2013.01); *H02M 3/156* (2013.01); *H02M 1/44* (2013.01)

(58) Field of Classification Search
CPC ..... H02M 1/08; H02M 3/335; H02M 3/33507
USPC .................................................. 323/283–285
See application file for complete search history.

(56) References Cited

U.S. PATENT DOCUMENTS

| | | | |
|---|---|---|---|
| 5,963,437 A | 10/1999 | Sekiya | |
| 7,016,204 B2 | 3/2006 | Yang et al. | |
| 7,667,500 B1 | 2/2010 | Alfke | |
| 7,719,305 B2 | 5/2010 | Chen | |
| 7,919,952 B1* | 4/2011 | Fahrenbruch | H02M 3/156 323/222 |
| 8,385,043 B2 | 2/2013 | Ng et al. | |
| 9,300,212 B2* | 3/2016 | Notman | H02M 3/1588 |
| 2008/0031021 A1 | 2/2008 | Ros | |
| 2008/0129264 A1* | 6/2008 | Moussaoui | H02M 3/156 323/283 |
| 2011/0199798 A1 | 8/2011 | Matthews | |
| 2011/0255315 A1 | 10/2011 | Ono | |
| 2011/0316502 A1* | 12/2011 | Tang | H02M 3/156 323/271 |
| 2012/0025799 A1* | 2/2012 | Tournatory | H02M 3/156 323/285 |

(Continued)

OTHER PUBLICATIONS

U.S. Appl. No. 14/143,504, filed Dec. 30, 2013, entitled "Suppression of Transients in Communications Across an Isolation Barrier," naming Michael J. Mills et al. as inventors.

(Continued)

*Primary Examiner* — Gary L Laxton
*Assistant Examiner* — Kyle J Moody
(74) *Attorney, Agent, or Firm* — Zagorin Cave LLP

(57) ABSTRACT

A pseudo-constant portion of a switching cycle (ON time or OFF time) is constant over short periods of time but the pseudo-constant portion is controlled over longer periods of time in a slow frequency control loop to maintain a desired frequency. The average frequency is maintained at or near a desired frequency but when there is a transient, local disturbance, or load change, or other occurrence, then for a short period of time the frequency will vary as the non pseudo-constant portion of the switching cycle changes to address the transient or other occurrence. The frequency control loop will slowly adjust the pseudo-constant portion of the switching cycle to return to the desired frequency.

22 Claims, 2 Drawing Sheets

(56) References Cited

U.S. PATENT DOCUMENTS

| | | | |
|---|---|---|---|
| 2012/0074915 A1* | 3/2012 | Lin | G05F 1/67 |
| | | | 323/234 |
| 2012/0155133 A1* | 6/2012 | Kim | H02J 5/005 |
| | | | 363/84 |
| 2012/0230069 A1 | 9/2012 | Tzeng | |
| 2013/0077350 A1* | 3/2013 | Mao | H02M 3/33523 |
| | | | 363/16 |
| 2013/0162048 A1 | 6/2013 | Kim | |
| 2013/0207630 A1* | 8/2013 | Rahardjo | H02M 3/156 |
| | | | 323/283 |
| 2013/0242626 A1 | 9/2013 | Li | |
| 2013/0293211 A1* | 11/2013 | Chen | H02M 3/1588 |
| | | | 323/282 |
| 2013/0328534 A1* | 12/2013 | Hsieh | G05F 3/02 |
| | | | 323/271 |
| 2014/0159686 A1* | 6/2014 | Lee | H02M 3/156 |
| | | | 323/282 |
| 2015/0200601 A1* | 7/2015 | Sagneri | H02M 3/158 |
| | | | 363/21.14 |

OTHER PUBLICATIONS

U.S. Appl. No. 14/168,854, filed Jan. 30, 2014, entitled "Soft-Start for Isolated Power Converter," naming Riad Wahby et al. as inventors.

* cited by examiner

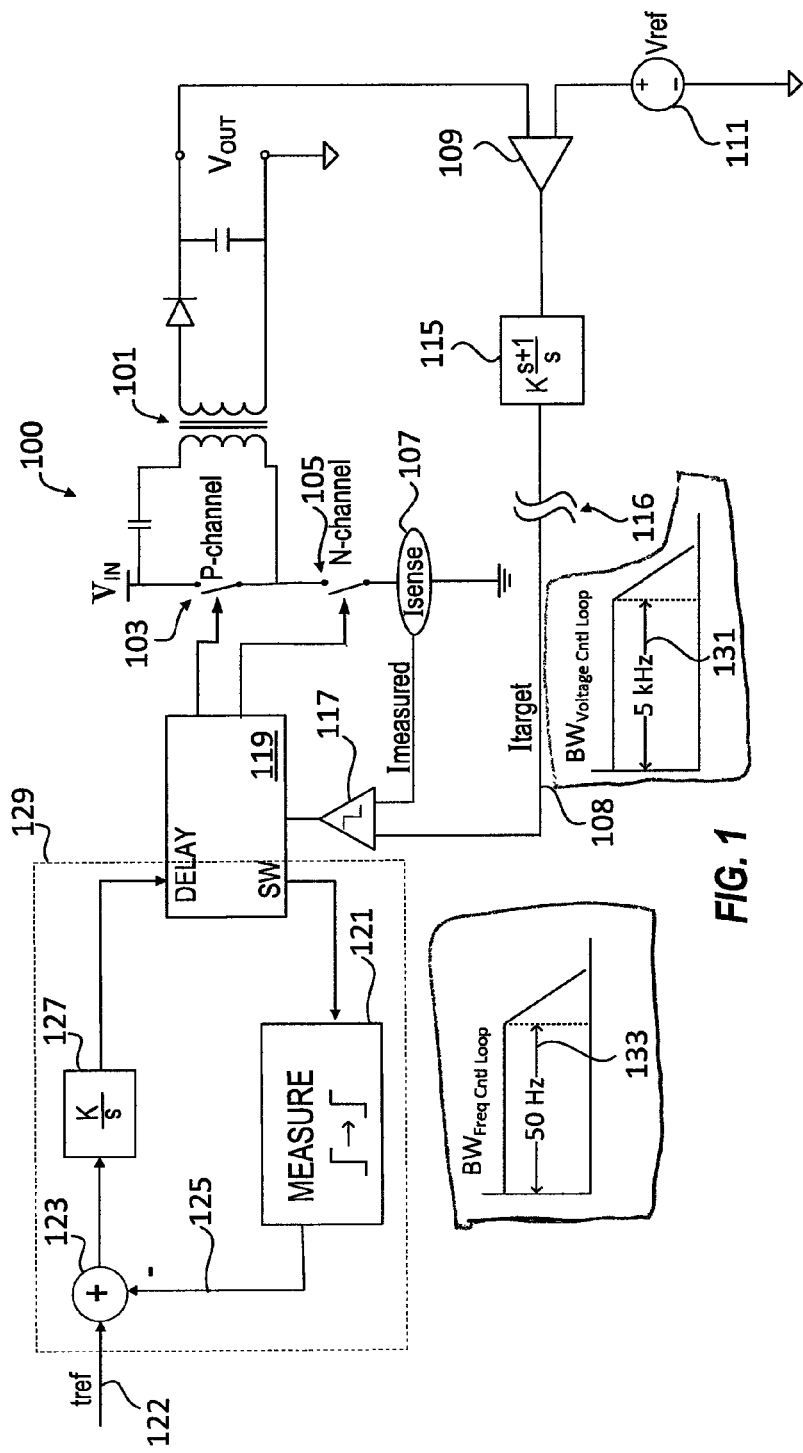
*FIG. 1*
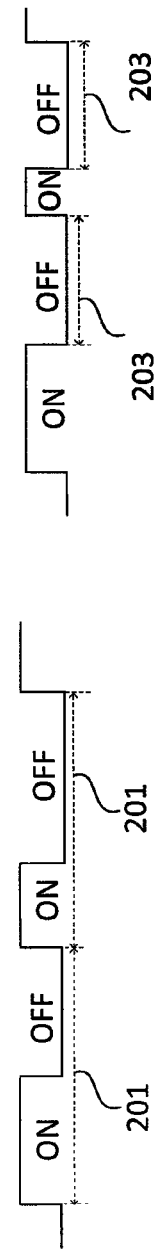
*FIG. 2A*
*FIG. 2B*

US 9,531,284 B2

PSEUDO-CONSTANT FREQUENCY CONTROL FOR VOLTAGE CONVERTER

BACKGROUND

Field of the Invention

This invention relates to voltage converters and more particularly to control of voltage converters.

Description of the Related Art

Voltage converters, also sometimes referred to as voltage regulators, are used in various applications to translate an input voltage to a regulated output voltage. Switching converters may provide, e.g., a regulated DC output voltage from an unregulated AC input or a translated DC output from a DC input. Such converters can be required when the voltage level of available power needs to be changed to meet the requirements of circuitry that operates at a higher or lower voltage than the available voltage.

SUMMARY

In one embodiment a voltage converter is provided having a switching cycle with an ON portion and an OFF portion. The voltage converter includes a current control loop to sense current through an inductor and to compare the sensed current to a threshold current value to determine when to end the ON portion, during which the current flows through the inductor. A voltage control loop senses the output voltage of the voltage converter and determines a difference between the sensed output voltage and a threshold voltage and supplies an indication of the difference for use in determining the threshold current value. A timing control loop compares a switching frequency of the voltage converter with a target switching frequency and adjusts the OFF portion of the switching cycle based on the comparison.

In another embodiment a voltage converter has a switching cycle with a first portion and a second portion. The voltage converter includes a first control loop to sense a parameter of the voltage converter and to end a first portion of the switching cycle based on the sensed parameter. The voltage converter further includes a frequency control loop to compare a switching frequency of the voltage converter with a target frequency and to generate an indication thereof. The frequency control loop adjusts the second portion of the switching cycle based on the indication. The second portion of the switching cycle is substantially constant over short periods of time but varying over longer periods of time.

In another embodiment a method is provided that includes sensing current flowing through an inductor and comparing the sensed current to a threshold current value to determine when to end an ON portion of a voltage converter having a switching cycle with the ON portion and an OFF portion to control the current through the inductor. The method further includes a voltage control loop determining a difference between an output voltage of the voltage converter and a reference voltage value and supplying an indication of the difference to adjust the threshold current value. A frequency control loop compares a switching frequency of the voltage converter with a target frequency and adjusts OFF time of the switching cycle based on the comparison. The adjusting of the OFF time occurs at a lower rate than adjustment of the current threshold.

In another embodiment a method includes sensing at least one parameter of a voltage converter and using the sensed parameter to end a first portion of a switching cycle of the voltage converter based on the sensed parameter, the switching cycle having the first portion and a second portion. The method further includes comparing a switching frequency of the voltage converter with a target frequency and generating an error indication thereof. The method adjusts the second portion of the switching cycle based on the error indication, the second portion of the switching cycle being a pseudo-constant portion of the switching cycle, the adjusting of the second portion using a frequency control loop having a first bandwidth that is lower than a second bandwidth of another control loop used in the voltage converter that is associated with determining when to end the first portion.

BRIEF DESCRIPTION OF THE DRAWINGS

The present invention may be better understood, and its numerous objects, features, and advantages made apparent to those skilled in the art by referencing the accompanying drawings.

FIG. 1 illustrates a voltage converter operating according to an embodiment.

FIG. 2A shows a timing diagram of a constant frequency approach for ON and OFF times for switching control.

FIG. 2B shows a timing diagram of a constant OFF time approach for switching control.

The use of the same reference symbols in different drawings indicates similar or identical items.

DETAILED DESCRIPTION

Figures 3, 4:
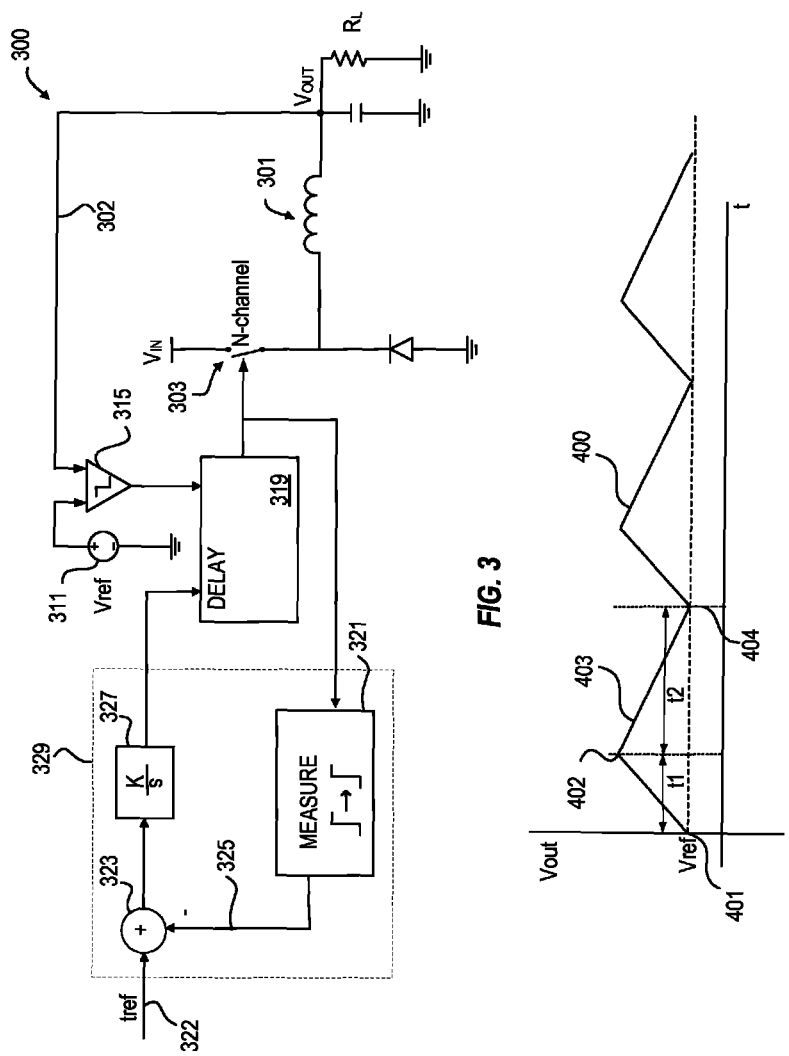
FIG. 3 illustrates a buck converter operating according to an embodiment of the invention.
FIG. 4 illustrates a diagram of output voltage versus time for the embodiment illustrated in FIG. 3.

Boost converters, buck/boost converters, flyback converters, asymmetric half bridge converters and other converter topologies store energy in the inductor in a portion of the converter switching cycle and take energy back out and transfer the energy into the output in another portion of the switching cycle. The current through the inductor represents the amount of energy stored in the inductor. Measurement of current through the inductor serves as a proxy for how much energy is being input in a particular cycle. One way to control voltage converters is to control how much energy is being put into the inductor by measuring peak current through the inductor. When the peak current reaches a desired threshold, the converter stops additional current from being input into the inductor for the remainder of the cycle to stop storing energy when the desired peak current is reached.

Referring to FIG. 1, operation of an exemplary converter 100 is illustrated. The voltage converter 100 includes a transformer 101 including primary side and second side inductors. Switches 103 and 105 are used to control the switching cycle. Current sensing circuit (Isense) 107 senses the current through the primary winding and provides the measurement to comparator 117. When the measured current exceeds the target peak current (Itarget) 108, the switch 105 turns off and the switch 103 turns on. In an embodiment, the switch 103 is implemented as a P-channel device and the switch 105 is implemented as an N-channel device. The output voltage determines the peak current target. Amplifier 109 detects a difference between the output voltage and a voltage reference 111 and supplies an indication of the difference (e.g., an amplified error indication of the difference between the output voltage and the reference voltage) that is used to adjust the target peak current. If the output voltage is too low, the target peak current is increased to increase the amount of energy that is input so as to raise the output voltage. Thus, a current control loop compares the measured current to a target current to control the ON time of switch 105 on a cycle-by-cycle basis. The voltage control loop controls the target peak current on a longer time scale. The voltage control loop includes a compensation block 115 that has appropriate compensation based on the particular implementation of the voltage converter. For example, the bandwidth of the voltage loop may be based on the target application, the need to more quickly, or more slowly respond to load transients.

There are several approaches to controlling the operation of the converter circuit. One control strategy is constant frequency as illustrated in FIG. 2A. A constant frequency control strategy provides a reasonably predictable spectrum. Peak current constant frequency control provides a fixed period 201 (thus a fixed frequency) with a variable duty cycle of ON and OFF times. During the ON time, energy is being stored by the inductor. When the peak current threshold is reached, the energy being input into the inductor is stopped (OFF time). The ON time varies based on the comparison of the current to the peak current target and the OFF time is adjusted so the OFF time occupies the remainder of the fixed period.

Most of the energy in a constant frequency control system is found at the fundamental frequency. Other spectral content depends on the duty cycle. A problem with fixed frequency peak current control is that the system can become unstable when duty cycle is greater than 50% (when ON time is greater than OFF time). Such a duty cycle can result in chaotic behavior resulting in having a long ON time, then a short ON time, etc. A solution to such chaotic behavior is to add another circuit that provides slope compensation. Slope compensation reduces gain in the positive feedback loop that causes the instability until the loop is no longer unstable. A slope compensation system senses the output voltage and adjusts the current target over the course of the cycle. The additional circuitry required for slope compensation can reduce performance of converter.

The exemplary voltage converter 100 is an isolated system and includes an isolated communication channel 116 to provide the sensed voltage information as feedback from the secondary to the primary side. Isolated communication channels are utilized in various applications where necessary to prevent current flow between separate electric circuits while still maintaining communication between the circuits. The isolation may be required for signal isolation, safety, or for other reasons. Within power conversion products, communication links that provide isolation typically provide control and/or feedback information between high and low voltage circuits in the power conversion products. Communication between isolated circuits has typically involved a transmitter and receiver communicating over a single isolation channel. The isolation channels may be implemented, e.g., using capacitive, optical, or inductive isolation techniques.

One way to provide the feedback of the output voltage is to send back the output voltage. In another approach, rather than sending the sensed output voltage, an amplified error signal is sent that is determined based on a comparison between the output voltage and a reference voltage. The precision necessary in the isolation channel can be less if there is gain in the system before the isolation channel so that the signal to noise ratio of the transmission of the error signal across the isolation channel is improved. An integrator provides such a gain in a frequency-dependent manner, and/or a simple amplification may also be used.

Constant frequency control can be implemented with an oscillator using a resistor and capacitor (RC) provided externally to the converter and the frequency of the voltage converter is locked to that oscillator. But that has the downside of using integrated circuit pins to connect the oscillator. Instead of constant frequency, another control approach uses constant OFF time for converters that use an intermediate storage element, or constant ON time. A constant OFF time control systems waits until the inductor current reaches its desired peak current and then turns OFF for a constant time 203 as illustrated in FIG. 2B. Thus, in a period composed of an ON portion and an OFF portion, the ON portion varies and the OFF portion is constant. That results in a variable period and thus a variable frequency. A variable frequency control approach can make it more difficult to build a printed circuit from an electromagnetic interference (EMI) compliance perspective. EMI compliance may require filters and having the fundamental frequency moving based on load can result in more difficulty to implement filters as compared to a constant frequency control approach.

When using constant OFF time, the system behaves as if it is ideally slope compensated. Constant OFF time removes the danger of instability and chaotic behavior that can result from ON time being greater than OFF time in the constant frequency case. Generally, constant OFF time is relatively easy to implement and requires a comparator and a constant delay. A problem with constant OFF time is the fact that frequency is changing. A variable frequency can be undesirable from, e.g., the perspective of controlling EMI. Accordingly, an embodiment utilizes the advantage of constant OFF time with constant frequency by using a pseudo-constant OFF time.

A pseudo-constant OFF time embodiment has constant OFF time over short periods of time but the OFF time varies over longer periods in a slow loop to maintain a desired frequency. OFF time is adjusted in a very slow loop that adjusts frequency by adjusting the OFF time. The loop reacts slowly to changes. The average frequency is close to a desired or predetermined frequency that can be set, e.g., programmably, but when there is a transient, local disturbance, or load change, or other occurrence, then for a short period of time the frequency will not be at target frequency because the ON time will vary to address the transient or other occurrence. But the frequency control loop will slowly adjust the OFF time to return to the desired frequency.

Referring to FIG. 1, the voltage converter 100 operates as follows. The N channel device 105 functions as the charging switch and the P channel device 103 functions as a discharge switch, which are controlled by control block 119. The control block may be implemented as a state machine, using a programmed microcontroller, or a combination of suitable control mechanisms known in the art to control the switching functions of the voltage converter described herein. Current sensing circuit 107 senses the current in the N-channel device 105, which is the current through the primary side inductor. Comparator 117 compares the sensed current to the current target based on the difference between the voltage on the secondary side and the reference voltage 111. When comparator 117 indicates that the target peak current has been reached, the control logic 119 turns off the N-channel device and turns on the P-channel device. After the delay of the pseudo constant OFF time, the control logic 119 turns on the N-channel and turns off the P-channel to start another charging cycle. The length of the pseudo-constant OFF time is adjusted based on a comparison of actual frequency with reference frequency.

The frequency control loop 129 controls the frequency by adjusting the OFF time. The frequency control loop provides a controlled delay (OFF time) instead of a fixed delay (OFF time), hence the OFF time is pseudo constant rather than being constant. The frequency control loop may be implemented as a delay-locked loop (DLL).

The frequency control loop 129 measures the frequency at which the voltage converter is operating, by, e.g., measuring the onset of cycle N to the onset of cycle N+1. Thus, e.g., the rising edges of the ON portions can be used to measure the period of a voltage regulator cycle in the measurement logic 121. The measured period is supplied to a compare node 123, which compares the measured period to a reference period and provides an error signal indicative of the difference. The reference period 122 can be programmed and supplied from a variety of sources. The reference period can be based, e.g., on an external resistor and capacitor or can be supplied digitally over a communication interface or from a non-volatile or volatile memory. The error determined in the compare node 123 controls the length of the constant OFF time. If the measured period is longer than the reference period then the OFF time is decreased by the frequency control loop. If the measured period is too short (switching frequency is too high) then the length of the OFF time is increased to decrease the frequency.

The loop includes a compensation block 127 to ensure loop stability. Gain should be chosen to ensure loop stability in a manner well known in the art. The particular gain choice will depend on the system. The exemplary compensation block is but one example of compensation that may be used in the loop and appropriate filters should be chosen according to the requirements of the particular implementation. In an embodiment, the frequency control loop 129 has an integrator with a very low crossover frequency. In one embodiment, the loop filter is a discrete time, digital filter with a sample rate equal to the switching frequency. Using an integrator with a very low crossover frequency limits the bandwidth of the frequency control loop as compared to the bandwidth of the voltage control loop that sets the peak current based on the output voltage. In embodiments the bandwidth of the voltage control loop is an order of magnitude or more greater than the bandwidth of the frequency control loop. For example, in one embodiment the bandwidth 131 of the voltage control loop is approximately 5 kHz and the bandwidth 133 of the frequency control loop is approximately 50 Hz. Those bandwidths are exemplary and other bandwidth may be utilized according to the requirements of the particular implementation. In one embodiment, the loop filter is implemented as digital, discrete time filter with a sample rate equal to the switching.

While the different bandwidths of the frequency control and voltage control loops ensure that the loops are substantially independent, there is interaction. When the timing loop slowly changes the OFF time to maintain the frequency, the voltage converter adjusts its operating point slightly. For example, if the switching frequency is too fast and the OFF time is increased to slow the frequency, the output voltage changes slightly, which in turn changes peak current. But the low bandwidth of the frequency control loop ensures the frequency loop does not strongly influence the voltage control loop. Thus, the frequency remains close to the predetermined desired frequency and the voltage converter still has most of the advantages of a constant OFF time implementation. The pseudo-constant OFF time embodiment described in FIG. 1 provides improved operation over a standard constant OFF time control approach, e.g., with respect to operation of the EMI filters, and has the advantages of constant OFF time without the disadvantages of instability that can occur in a constant frequency control implementation.

While the pseudo-constant OFF time approach is useful for converter topologies that store in the inductor in a portion of the converter switching cycle and take energy back out and transfer the energy into the output during another portion of the cycle, the pseudo-constant frequency control approach may be used in other topologies. For example, the approach may be used in buck converters where energy goes directly from input to output.

Referring to FIG. 3, an exemplary embodiment illustrates a buck converter 300 that has pseudo-constant ON time. FIG. 4 illustrates a timing diagram illustrating output voltage versus time associated with the embodiment of FIG. 3. The buck converter includes inductor 301 and a switch 303, shown in FIG. 3 as an N-channel device. The control logic (delay) 319 turns on the switch 303 for a pseudo constant period of time t1 at 401 (see FIG. 4). After the delay time t1 has been reached, the control logic 319 turns off the switch at 402. The output voltage drops as shown at 403. The voltage loop operates to watch for the output voltage Vout and drops below the reference voltage 311 during the time period t2. When the comparator 315 detects that Vout is at (or below) the reference voltage, the control logic turns the switch 303 back on to start the cycle again. Thus, the switch is on for a pseudo-constant amount of time which charges up Vout and turns off until the output voltage is too low.

In order to control frequency, a frequency control loop 329 compares the measured switch cycle frequency to a reference frequency. The loop 329 measures the frequency at which the voltage converter is operating, by, e.g., measuring the onset of cycle N to the onset of cycle N+1. Thus, the rising edges of the control signal supplied to switch 303 can be used to measure the period of a voltage regulator cycle in the measurement logic 321. The measured period is supplied to a compare node 323, which compares the measured period to a reference period 322 and provides an error signal indicative of the difference. The reference period 322 can be programmed and supplied from a variety of sources. The reference period can be based, e.g., on an external resistor and capacitor or can be supplied digitally over a communication interface or from a non-volatile or volatile memory. The error controls the length of the constant ON time and that length is supplied to control logic 319 as DELAY. If the measured period is longer than the reference period (frequency too low) then the ON time is decreased by the loop to increase the switching frequency. If the measured period is too short (switching frequency is too high) then the length of the ON time is increased to decrease the switching frequency. Loop compensation depends on implementation of the particular system, e.g., K/s, where K is an appropriate gain factor. Constant on time control is simple but has no instability like current mode control so there is no need for slope compensation. Thus, a pseudo-constant frequency approach of FIG. 3 does not remove the need for slope compensation as it is not needed. Constant ON time control provides very fast responses to transients because of the nature of such a nonlinear control system.

Thus, as can be seen from the embodiment of FIG. 1 and FIG. 3 the pseudo-constant portion (OFF time or ON time) of the switching cycle is slowly varied to keep the switching frequency of the voltage converter locked to a reference frequency to provide a pseudo-constant frequency. While delay loops can be used, other kinds of timing loops can be used to slowly vary the pseudo-constant portion of the switch cycle. The description of the invention set forth herein is illustrative, and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. A voltage converter having a switching cycle with an ON portion and an OFF portion, the voltage converter comprising:
   a current control loop to sense a current flowing through an inductor and to compare the sensed current to a threshold current value to determine when to end the ON portion by turning off a switch, wherein the current flows through the inductor and the switch during the ON portion;
   a voltage control loop to sense an output voltage of the voltage converter and to determine a difference between the sensed output voltage and a reference voltage and to supply an indication of the difference for use in determining the threshold current value; and
   a timing control loop to compare a switching frequency of the voltage converter with a target switching frequency and to adjust the OFF portion of the switching cycle based on the compare of the switching frequency with the target switching frequency;
   wherein a bandwidth of the timing control loop is lower than a bandwidth of the voltage control loop.

2. The apparatus of claim 1 wherein the bandwidth of the timing control loop is lower than the bandwidth of the voltage control loop by at least an order of magnitude.

3. The voltage converter, as recited in claim 1, wherein the timing control loop is coupled to receive a reference cycle length corresponding to the target switching frequency and to compare a measured switching cycle length corresponding to the switching frequency of the voltage converter to the reference cycle length and generate an error signal indicative of the comparison of the measured switching cycle length to the reference cycle length.

4. The voltage converter, as recited in claim 3, wherein the timing control loop includes an edge to edge measurement circuit to generate the measured switching cycle length.

5. The voltage converter as recited in claim 4 wherein the timing control loop includes a loop compensation circuit including an integrator coupled to receive the error signal.

6. The voltage converter, as recited in claim 1, wherein the voltage converter is a DC to DC converter.

7. The voltage converter, as recited in claim 1, further comprising:
   an isolation channel; and
   wherein the current control loop includes,
      a current sense circuit to sense the current flowing through the inductor;
      a first compare circuit to compare the sensed current to the threshold current value; and
      control logic to turn off the switch coupled between the inductor and ground in response to the sensed current being greater than the threshold current value; and
   wherein the voltage control loop includes,
      a second compare circuit to compare the output voltage with the reference voltage and supply the indication of the difference across the isolation channel, the indication of the difference being used in determining the threshold current value.

8. A voltage converter having a switching cycle with a first portion and second portion, the voltage converter comprising:
   a first control loop to sense a parameter of the voltage converter and to end the first portion of the switching cycle based on the sensed parameter; and
   a frequency control loop to compare a switching frequency of the voltage converter with a target frequency and to generate an indication thereof and to adjust the second portion of the switching cycle based on the indication,
   wherein a bandwidth of the frequency control loop is approximately an order of magnitude or more, lower than a bandwidth of the first control loop.

9. The voltage converter as recited in claim 8 wherein the second portion of the switching cycle is substantially constant over short periods of time but varies over longer periods of time as determined by the bandwidth of the frequency control loop.

10. The voltage converter as recited in claim 8 wherein the second portion is an OFF portion of the switching cycle.

11. The voltage converter as recited in claim 8 wherein the second portion is an ON portion of the switching cycle.

12. The voltage converter as recited in claim 8 further comprising a current control loop to sense current flowing through an inductor of the voltage converter and to compare the sensed current to a threshold current value to determine when to end an ON portion, the ON portion being the first portion, the current flowing through the inductor during the ON portion and wherein the first control loop is a voltage control loop to sense output voltage of the voltage converter and to adjust the threshold current value based on the sensed output voltage.

13. The voltage converter as recited in claim 8 wherein the first control loop is a voltage control loop to sense output voltage of the voltage converter and to turn on a switch controlling current through an inductor when the output voltage falls below a reference voltage.

14. A method comprising:
   sensing current flowing through an inductor;
   comparing the sensed current to a threshold current value to determine when to end an ON portion of a voltage converter having a switching cycle with the ON portion and an OFF portion to control the current flowing through the inductor;
   determining in a voltage control loop a difference between an output voltage of the voltage converter and a reference voltage value and supplying a voltage difference indication indicative thereof to adjust the threshold current value;
   comparing in a frequency control loop a switching frequency of the voltage converter with a target frequency and supplying a frequency indication indicative thereof; and
   adjusting a duration of the OFF portion of the switching cycle based on the frequency indication, the adjusting of the duration of the OFF portion in the frequency control loop occurring at a lower rate than adjustment of the threshold current value,
   wherein adjusting the duration of the OFF portion by the frequency control loop changes a frequency of the switching cycle and adjustment of the threshold current value does not affect the frequency of the switching cycle; and
   wherein a bandwidth of the frequency control loop is lower than a bandwidth of the voltage control loop.

15. The method as recited in claim 14, wherein the frequency control loop has a lower bandwidth than the voltage control loop by at least approximately an order of magnitude.

16. The method as recited in claim 14, further comprising:
in the frequency control loop, comparing a measured period length of the switching cycle to a reference period length and generating an error signal indicative of the comparison as the frequency indication; and
integrating the error signal.

17. The method as recited in claim 14, further comprising:
supplying the voltage difference indication across an isolation channel; and
using the voltage difference indication in generating the threshold current value.

18. A method comprising:
sensing at least one parameter of a voltage converter and using the sensed parameter to end a first portion of a switching cycle of the voltage converter based on the sensed parameter, the switching cycle having the first portion and a second portion;
comparing a switching frequency of the voltage converter with a target frequency and generating an error indication thereof; and
adjusting the second portion of the switching cycle based on the error indication, the adjusting of the second portion using a frequency control loop having a first bandwidth that is lower than a second bandwidth of another control loop used in the voltage converter that is associated with determining when to end the first portion.

19. The method as recited in claim 18 wherein the first bandwidth of the frequency control loop provides that the second portion of the switching cycle is substantially constant over short periods of time but varies over longer periods of time to thereby provide a pseudo-constant portion of the switching cycle, wherein the pseudo-constant portion is an OFF portion of the switching cycle.

20. The method as recited in claim 18, further comprising:
sensing current through an inductor;
comparing the sensed current to a threshold current value to determine when to end an ON portion of the switching cycle having the ON portion and an OFF portion, to control the current through the inductor;
sensing an output voltage of the voltage converter; and
comparing in a voltage control loop the output voltage of the voltage converter to a reference voltage value and supplying an indication thereof to adjust the threshold current value.

21. The method as recited in claim 18, further comprising:
comparing in a voltage control loop an output voltage of the voltage converter to a reference voltage value and supplying an indication thereof;
using the indication to determine when to end an ON portion of the switching cycle.

22. The method as recited in claim 18 wherein the first bandwidth of the frequency control loop provides that the second portion of the switching cycle is substantially constant over short periods of time but varies over longer periods of time to thereby provide a pseudo-constant portion of the switching cycle, wherein the pseudo-constant portion of the switching cycle is an ON portion of the switching cycle.

* * * * *